Aug. 21, 1934.   W. H. RICE ET AL   1,971,120
HOSE AND NOZZLE COUPLING
Filed Nov. 19, 1931
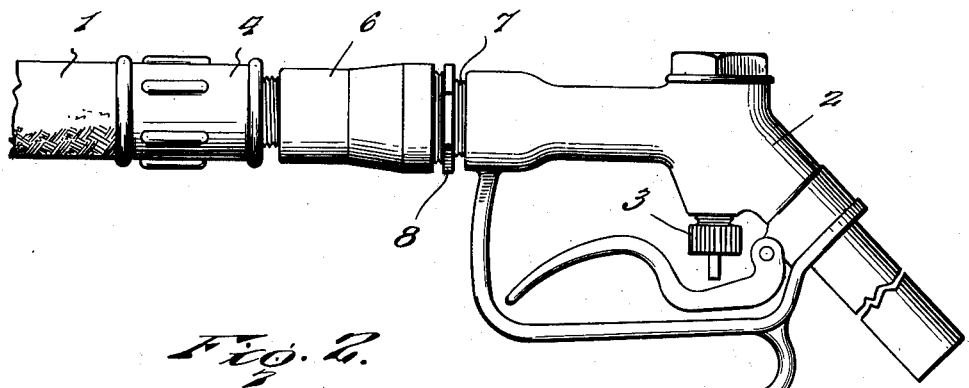
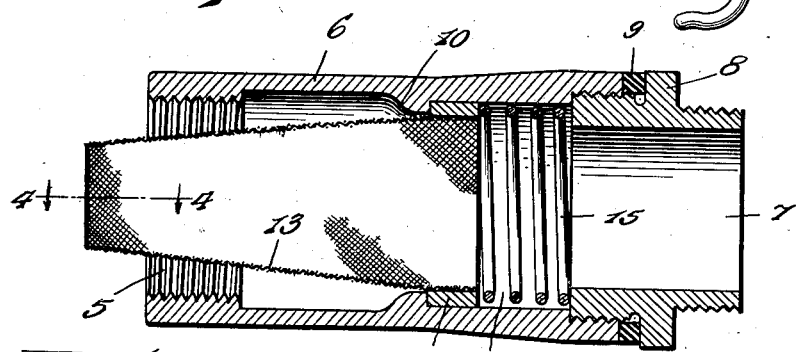
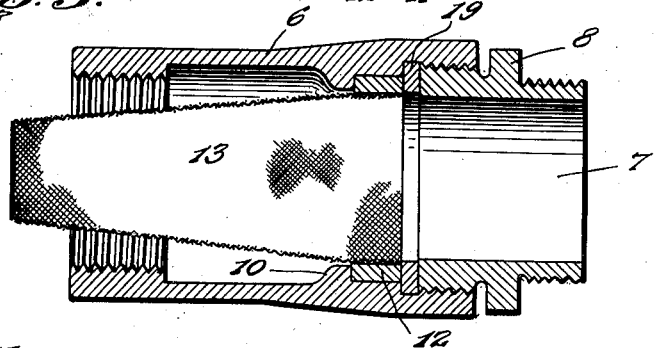
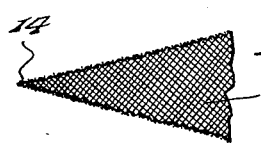
Inventors
W. H. Rice.
H. M. Lyon.

Patented Aug. 21, 1934

1,971,120

UNITED STATES PATENT OFFICE 1,971,120

HOSE AND NOZZLE COUPLING

William Hubert Rice and Hancel Maynard Lyon, Atlanta, Ga.

Application November 19, 1931, Serial No. 576,140

1 Claim. (Cl. 210—170)

This invention has for its object the provision of means whereby gasoline flowing to a discharge nozzle will be filtered and the impurities therein prevented from flowing through the nozzle, and also to provide a coupling between the nozzle and the hose which may be easily detached and which will house a filtering screen loosely or slidably mounted therein. The invention is illustrated in the accompanying drawing and will be hereinafter fully described, the novel features being particularly defined in the appended claim.

In the drawing,

Figure 1 is a side elevation of a gasoline dispensing nozzle having our present invention employed therein, Fig. 2 is a longitudinal section of the coupling, Fig. 3 is a view similar to Fig. 2 but showing a slight variation, Fig. 4 is a detail section on the line 4—4 of Fig. 2.

The reference numeral 1 indicates a hose which is connected to and leads from a gasoline dispensing pump, and the numeral 2 indicates a nozzle through which the gasoline is discharged into the fuel tank of a motor vehicle, the nozzle being equipped with a valve, indicated at 3, whereby the flow therethrough may be controlled. The end of the hose is provided with a coupling thimble or sleeve 4 which is permanently attached thereto and is adapted to be engaged in one internally threaded end 5 of a coupling sleeve 6, the opposite end of said sleeve being fitted over a short collar or hub 7 which is secured in the end of the nozzle 2, as will be understood upon reference to Fig. 1. The collar 7 is provided between its ends with an annular rib 8 against which the end of the coupling sleeve 6 may seat, a gasket 9 being interposed between the end of the coupling sleeve and said rib, as shown in Fig. 2, whereby leakage of the fluid will be prevented. The coupling sleeve 6 is provided between its ends with an internal annular rib 10 and the bore of the collar 7 is of somewhat less diameter than the bore of the sleeve so that a chamber 11 is formed between the rib 10 and the end of the collar 7, also as clearly shown in Figs. 2 and 3. Disposed within the chamber 11 is a ring or ferrule 12 which fits closely but slidably therein and is secured to and around the basal end of a tapered filtering screen 13. The screen 13 may be formed of any suitable material, preferably wire netting of fine mesh, and it is substantially conical in form with its apex presented to the hose or against the flow of the fluid, the apex or smaller end of the screen being compressed and flattened, as shown at 14 in Fig. 4.

In Fig. 3, the ring or ferrule 12 is shown abutting the rib 10 at one side and at the other side abutting the gasket 19 which, in turn, abuts the end of the collar 7, but in Fig. 2 the ferrule may have a sliding movement, limited by the interposition of an expansion coiled spring 15 which bears, at one end, against the ring or ferrule and, at its opposite end, against the end of the collar 7. Being slidable within the chamber 11, the screen may yield somewhat to the force of the gasoline, or other liquid, when the flow is initially set up so that the screen is not apt to be damaged by the sudden pressure placed upon it. When the spring 15 is pressed, it will yield to the initial movement of the screen but will quickly expand and hold the ferrule or ring 12 against the rib 10 so that the screen will be maintained in proper position to perform its filtering function. It should also be noted that the strainer is of such length that its free end portion projects from the end of the body into which the thimble or sleeve 6 is screwed. Therefore, when the thimble is screwed into the body, the free end of the strainer extends into the thimble, or sleeve, and thus eliminates danger of the strainer catching against the end of the sleeve and becoming crushed or mutilated. Also, when the strainer is moved by fluid pressure against action of the spring, there will be no danger of its free end catching against the end of the sleeve, or thimble, 6 and causing the strainer to be bent out of shape when the spring forces it back towards its original position. In both forms of the invention, the impurities in the liquid will be arrested by the screen and will be deflected to the side of the coupling sleeve and will accumulate between the rib 10 and the entrance end of the sleeve. When the attendant deems that cleaning of the device is necessary or desirable, the coupling sleeve 6 is rotated a few times and will be thereby detached from the collar 7 giving access to the chamber 11 and the ferrule 12 therein. The ferrule with the screen attached thereto may be quickly and easily removed and the accumulation within the sleeve drawn out so that the device will be again fully operative. The screen is then replaced and the coupling sleeve again engaged with the collar 7, restoring the parts to their assembled relation. The device is exceedingly simple and the work of removing the accumulation will occupy only a few seconds time.

Both forms of the invention provide a coupling which may be used on any pump without interfering with the devices provided for locking the pumps when the station is not in service. The form shown in Fig. 3 may be used on visible type pumps while the form shown in Fig. 2 is especially adapted for use on meter type pressure pumps.

Having thus described the invention, we claim,

In a device of the character described, a tubular body open at both ends and having one end portion internally threaded for engagement with a hose thimble and its other end portion internally threaded to receive a nozzle-engaging nipple, the portion of the body adjoining the last-mentioned threaded end being provided with a cylindrical chamber and at the inner end of said chamber being formed with an annular rib constituting an abutment shoulder, an elongated hollow screen extending longitudinally in said body and provided at one end with a ferrule fitting snugly in the cylindrical chamber against said shoulder and slidable in the chamber, a coiled spring in said chamber having its inner end bearing against said ferrule, and a nozzle-engaging nipple threaded into the last-mentioned end of said body and bearing against the outer end of said spring to tension the spring and yieldably hold the screen in a normal position with the ferrule seated against said shoulder, said screen being of a length to extend longitudinally in the tubular body with its free end portion projecting outwardly from the first-mentioned end of the body.

WILLIAM HUBERT RICE. [L. S.]
HANCEL MAYNARD LYON. [L. S.]